(12) United States Patent
D'Errico et al.

(10) Patent No.: US 8,923,701 B2
(45) Date of Patent: Dec. 30, 2014

(54) WIRELESS COMMUNICATIONS LINKS

(75) Inventors: Antonio D'Errico, Calci (IT); Marzio Puleri, Fiano Romano (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 85 days.

(21) Appl. No.: 13/702,566

(22) PCT Filed: Jun. 16, 2010

(86) PCT No.: PCT/EP2010/058443
§ 371 (c)(1),
(2), (4) Date: Jan. 28, 2013

(87) PCT Pub. No.: WO2011/154057
PCT Pub. Date: Dec. 15, 2011

(65) Prior Publication Data
US 2013/0129341 A1   May 23, 2013

(30) Foreign Application Priority Data

Jun. 9, 2010 (EP) .................................. 10165420

(51) Int. Cl.
*H04B 10/00* (2013.01)
*H04B 10/032* (2013.01)
*H04B 10/112* (2013.01)

(52) U.S. Cl.
CPC .......... *H04B 10/032* (2013.01); *H04B 10/1123* (2013.01)
USPC ........... 398/115; 398/116; 398/118; 398/119; 398/120; 398/128; 398/130; 398/23; 398/24; 398/5; 398/17; 398/19

(58) Field of Classification Search
CPC .. H04B 10/11; H04B 10/112; H04B 10/1121; H04B 10/1123; H04B 10/1127; H04B 10/1129; H04B 10/0791; H04B 10/0795; H04B 10/032; H04B 10/40; H04B 10/43

USPC ......... 398/115, 116, 117, 118, 3, 5, 119, 120, 398/127, 128, 130, 131, 126, 125, 135, 136, 398/17, 19, 33, 38, 23, 24, 45
See application file for complete search history.

(56) References Cited

U.S. PATENT DOCUMENTS 6,763,195 B1 * 7/2004 Willebrand et al. .......... 398/115
7,453,835 B1 * 11/2008 Coty et al. .................... 370/310
(Continued)

FOREIGN PATENT DOCUMENTS

WO   0152450 A2   7/2001
WO   0232020 A1   4/2002

OTHER PUBLICATIONS

International Search Report, Application No. PCT/EP2010/058443, dated Mar. 31, 2011, 3 pages.

*Primary Examiner* — Hanh Phan
(74) *Attorney, Agent, or Firm* — Blakely Sokoloff Taylor & Zafman LLP

(57) ABSTRACT

A wireless communications link comprising an RF link and a free space optics (FSO) link, a switch, an RF signal monitoring apparatus, an optical signal monitoring apparatus, alarm apparatus and a controller. The switch operates in a normal mode to aggregate the links to form a link aggregation group and to route traffic on the link aggregation group, a first protection mode to route traffic on the FSO link, or a second protection mode to route traffic on the RF link. The controller is arranged to receive an alarm signal and to generate and transmit a control signal to cause the switch to operate in the first protection mode when a first alarm signal is received, the second protection mode when a second alarm signal is received, and the normal mode when an indicator is received indicating that both signal quality parameters are above their threshold values.

17 Claims, 5 Drawing Sheets

(56) References Cited

U.S. PATENT DOCUMENTS

2002/0122230 A1* 9/2002 Izadpanah et al. ............ 359/145
2004/0062551 A1* 4/2004 ElBatt et al. .................. 398/115
2004/0208591 A1 10/2004 Willebrand et al.

* cited by examiner

US 8,923,701 B2

WIRELESS COMMUNICATIONS LINKS

CROSS-REFERENCE TO RELATED APPLICATIONS

This application is a National stage of International Application No. PCT/EP2010/058443, filed Jun. 16, 2010, which claims priority to EP Application No. 10165420.0, filed Jun. 9, 2010, which are hereby incorporated by reference.

TECHNICAL FIELD

The invention relates to a wireless communications link, a router for a wireless communications link and a method of routing traffic for transmission on a wireless communications link.

BACKGROUND

One of the major expenses for wireless communications network service providers is the backhaul of traffic, which is rapidly increasing due to the introduction of high speed data services. There is therefore a need to add transmission capacity to the backhaul of wireless communications networks in order to handle the increasing data traffic and other traffic such as voice traffic. One solution which has been considered is to use both microwave backhaul and fibre optic backhaul in the lower radio access network of a wireless communications network, in place of the conventional microwave backhaul. However, while a fibre optic backhaul provides a much higher traffic transmission capacity than a microwave backhaul, the costs of implementing a fibre optic backhaul are considerably higher than a microwave backhaul. A further solution, which offers the higher transmission capacity of a fibre optic backhaul but without the same installation costs, is a free space optics backhaul. A free space optics transmission system works in a similar way to a fibre optic transmission system, with the only difference being that the optical signals are propagated in air as the transport medium. Whilst free space optics backhaul systems offer higher transmission capacity, they can be less reliable than microwave backhaul due to their greater susceptibility to failure due to adverse weather conditions. A solution to this has been proposed in US 2004/0208591 in which a hybrid wireless optical and radio frequency communications link is provided. The optical (freespace optics) link is used to provide the primary transmission path for traffic, whilst the radio frequency link provides a backup path for traffic and a primary path for control and status signaling. When atmospheric conditions degrade the optical link to the point where optical signal transmission fails, transmission is switched to the radio frequency link.

SUMMARY

It is an object to provide an improved wireless communications link. It is a further object to provide an improved routing apparatus for a wireless communications link comprising a radio frequency communications link and a free space optics communications link arranged for parallel transmission of traffic. It is a further object to provide an improved method of routing traffic for transmission on a wireless communications link comprising a radio frequency communications link and a free space optics communications link arranged for parallel transmission of traffic.

A first aspect of the invention provides a wireless communications link comprising a radio frequency communications link and a free space optics communications link arranged for parallel transmission of traffic. The wireless communications link further comprises a switch, link monitoring apparatus and a controller. The switch is arranged to operate in one of a normal mode, a first protection mode and a second protection mode. In the normal mode the switch is arranged to aggregate the links to form a link aggregation group and to route received traffic for transmission on the link aggregation group. In the first protection mode the switch is arranged to route received traffic for transmission on only the free space optics communications link. In the second protection mode the switch is arranged to route at least some of said received traffic for transmission on only the radio frequency communications link. The link monitoring apparatus comprises radio frequency signal monitoring apparatus, optical signal monitoring apparatus and alarm apparatus. The radio frequency signal monitoring apparatus is arranged to measure a first signal quality parameter for the radio frequency communications link. The optical signal monitoring apparatus is arranged to measure a second signal quality parameter for the free space optics communications link. The alarm apparatus is arranged to generate and transmit a first alarm signal in response to the first signal quality parameter having a value below a first threshold value. The alarm apparatus is further arranged to generate and transmit a second alarm signal in response to the second signal quality parameter having a value below a second threshold value. The controller is arranged to receive one of a said first alarm signal, a said second alarm signal and an indicator indicating that the first signal quality parameter is above the first threshold value and the second signal quality parameter is above the second threshold value. The controller is further arranged to generate and transmit a control signal to cause the switch to operate in one of the first protection mode when a said first alarm signal is received, the second protection mode when a said second alarm signal is received, and the normal mode when a said indicator is received.

The radio frequency communications link signal quality is affected by different atmospheric conditions (for example, heavy rain) than the free space optics communications link (for example, heavy fog), the two different links may therefore reciprocally mitigate their susceptibilities to failure due to adverse weather conditions, so the wireless communications link may operate to always have at least one part of link available to carry traffic. In the normal mode, the switch implements link aggregation of the radio frequency and free space optics communications links, thereby combining the advantages of link aggregation (enabling the establishment of a link which has a higher aggregate bandwidth than the individual links that have been aggregated) with the reciprocal mitigation of susceptibility to adverse weather conditions. The wireless communications link may therefore be used as a single primary link, for example as part of the backhaul of a mobile communications network, with a very high link availability and reliability. The wireless communications link may provide low power consumption per transmitted bit of traffic. The wireless communications link may offer high traffic transmission capacity through the free space optics link.

In an embodiment, the radio frequency communications link comprises a plurality of microwave radio communications links and the link monitoring apparatus comprises a corresponding plurality of radio frequency signal monitoring apparatus arranged to measure a signal quality parameter for a respective said microwave radio link. The alarm apparatus is arranged to generate and transmit a third alarm signal in response to a said first signal quality parameter of a respective microwave radio link having a value below the first threshold value. The controller is arranged to receive the third alarm signal. The controller is further arranged to generate and transmit a control signal to cause the switch to turn off said microwave radio link and to operate in the normal mode in respect of the free space optics link and each microwave radio link for which a said third alarm signal has not been received.

The wireless communications link may therefore disable a microwave radio communications link having a signal quality parameter below the threshold value and continue to operate in the normal mode with the remaining microwave radio communications links aggregated with the free space optics communications link.

In an embodiment, the alarm apparatus is arranged to generate and transmit a first alarm signal in response to the first signal quality parameter of each microwave radio link having a value below the first threshold value.

In an embodiment, the switch comprises an Ethernet self-learning switch arranged to operate in accordance with the IEEE 802.1p and IEEE 802.1q standards and to aggregate the links in accordance with the IEEE 802.1AX-2008 link aggregation standard.

In an embodiment, the received traffic comprises high priority traffic and non-high priority traffic and the radio communications link has a traffic transmission capacity. The switch is arranged to operate in the second protection mode to route high priority traffic for transmission in preference to non-high priority traffic and to hold any non-high priority traffic in excess of the traffic transmission capacity. The wireless communications link may therefore provide high link availability for high priority traffic.

In an embodiment, the received traffic comprises high quality traffic and high priority traffic and best effort traffic. The switch is arranged to operate in the second protection mode to route the high quality traffic and the high priority traffic for transmission in preference to the best effort traffic. The switch is further arranged to hold any best effort traffic in excess of the traffic transmission capacity. The wireless communications link may therefore provide high link availability for high priority and quality traffic, with high priority and quality traffic taking transmission priority over non-high priority traffic in the case of traffic congestion. The wireless communications link may guarantee traffic priorities and quality of service.

In an embodiment, the switch is arranged to hold the best effort traffic until the switch is caused to operate in one of the normal mode and the first protection mode.

In an embodiment, the indicator comprises one of the end of a said first alarm signal, the end of a said second alarm signal, a first alarm off signal and a second alarm off signal.

In an embodiment, the radio frequency signal monitoring apparatus is arranged to monitor at least one of signal power and bit error rate. The alarm apparatus is arranged to generate and transmit a first alarm signal in response to at least one of the signal power having a value below a threshold power and the bit error rate having a value below a threshold bit error rate.

In an embodiment, the optical signal monitoring apparatus is arranged to monitor at least one of signal power and bit error rate. The alarm apparatus is arranged to generate and transmit a first alarm signal in response to at least one of the signal power having a value below a threshold power and the bit error rate having a value below a threshold bit error rate.

In an embodiment, the switch comprises optical signal monitoring apparatus arranged to monitor signal power.

In an embodiment, in the normal mode the switch is arranged to route traffic bandwidth demand peaks on the free space optics link.

In an embodiment, each microwave radio communications link comprises a radio unit and an indoor unit. The radio unit comprises radio frequency signal monitoring apparatus is arranged to monitor signal power. The indoor unit comprises radio frequency signal monitoring apparatus arranged to monitor bit error rate.

In an embodiment, the wireless communications link additionally comprises a further switch and a further controller. The link may therefore transmit traffic in both directions.

In an embodiment, the optical signal monitoring apparatus is provided within one controller and is arranged to monitor bit error rate. The optical signal monitoring apparatus is arranged to receive an operation and maintenance (O&M) signal from the other controller and to determine the bit error rate from the received O&M signal.

A second aspect of the invention provides routing apparatus for a wireless communications link comprising a radio frequency communications link and a free space optics communications link arranged for parallel transmission of traffic. The apparatus comprises a switch and a controller. The switch is arranged to operate in one of a normal mode, a first protection mode and a second protection mode. In the normal mode the switch is arranged to aggregate the links to form a link aggregation group and to route received traffic for transmission on the link aggregation group. In the first protection mode the switch is arranged to route received traffic for transmission on only the free space optics communications link. In the second protection mode the switch is arranged to route at least some of said received traffic for transmission on only the radio frequency communications link. The controller is arranged to receive one of a first alarm signal, a second alarm signal and an indicator. The first alarm signal is indicative that a first signal quality parameter of the radio frequency communications link has a value below a first threshold value. The second alarm signal is indicative that a second signal quality parameter of the free space optics communications link has a value below a second threshold value. The indicator is indicative that the first signal quality parameter is above the first threshold value and the second signal quality parameter is above the second threshold value. The controller is further arranged to generate and transmit a control signal to cause the switch to operate in one of the first protection mode when a said first alarm signal is received, the second protection mode when a said second alarm signal is received, and the normal mode when a said indicator is received.

The radio frequency communications link signal quality is affected by different atmospheric conditions (for example, heavy rain) than the free space optics communications link (for example, heavy fog). The router may be operated to reciprocally mitigate the susceptibilities of the two different links to failure due to adverse weather conditions, so the router may always be able to route traffic on at least one part of the wireless communications link. In the normal mode, the switch implements link aggregation of the radio frequency and free space optics communications links, thereby combining the advantages of link aggregation (enabling the establishment of a link which has a higher aggregate bandwidth than the individual links that have been aggregated) with the reciprocal mitigation of susceptibility to adverse weather conditions. The router may therefore enable the radio frequency communications link and a free space optics communications link to be used as a single primary link, for example as part of the backhaul of a mobile communications network, with a very high link availability and reliability. The router may offer high traffic transmission capacity by routing traffic through the free space optics link.

In an embodiment, the routing apparatus further comprises link monitoring apparatus comprising radio frequency signal monitoring apparatus, optical signal monitoring apparatus and alarm apparatus. The radio frequency signal monitoring apparatus is arranged to measure the first signal quality parameter for the radio frequency communications link. The optical signal monitoring apparatus is arranged to measure the second signal quality parameter for the free space optics communications link. The alarm apparatus is arranged to generate and transmit a first alarm signal in response to the first signal quality parameter having a value below the first threshold value. The alarm apparatus is further arranged to generate and transmit a second alarm signal in response to the second signal quality parameter having a value below the second threshold value.

In an embodiment, the radio frequency communications link comprises a plurality of microwave radio communications links and the link monitoring apparatus comprises a corresponding plurality of radio frequency signal monitoring apparatus arranged to measure a signal quality parameter for a respective said microwave radio link. The alarm apparatus is arranged to generate and transmit a third alarm signal in response to a said first signal quality parameter of a respective microwave radio link having a value below the first threshold value. The controller is arranged to receive the third alarm signal. The controller is further arranged to generate and transmit a control signal to cause the switch to turn off said microwave radio link and to operate in the normal mode in respect of the free space optics link and each microwave radio link for which a said third alarm signal has not been received.

The router may therefore disable a microwave radio communications link having a signal quality parameter below the threshold value and continue to operate in the normal mode with the remaining microwave radio communications links aggregated with the free space optics communications link.

In an embodiment, the alarm apparatus is arranged to generate and transmit a first alarm signal in response to the first signal quality parameter of each microwave radio link having a value below the first threshold value.

In an embodiment, the switch comprises an Ethernet self-learning switch arranged to operate in accordance with the IEEE 802.1p and IEEE 802.1q standards and to aggregate the links in accordance with the IEEE 1AX-2008 link aggregation standard.

In an embodiment, the received traffic comprises high priority traffic and non-high priority traffic and the radio communications link has a traffic transmission capacity. The switch is arranged to operate in the second protection mode to route high priority traffic for transmission in preference to non-high priority traffic and to hold any non-high priority traffic in excess of the traffic transmission capacity. The router may therefore provide high link availability for high priority and quality traffic, with high priority and quality traffic taking transmission priority over non-high priority traffic in the case of traffic congestion. The router may guarantee traffic priorities and quality of service.

In an embodiment, the received traffic comprises high quality traffic and high priority traffic and best effort traffic. The switch is arranged to operate in the second protection mode to route the high quality traffic and the high priority traffic for transmission in preference to the best effort traffic. The switch is further arranged to hold any best effort traffic in excess of the traffic transmission capacity.

In an embodiment, the switch is arranged to hold the best effort traffic until the switch is caused to operate in one of the normal mode and the first protection mode.

In an embodiment, in the normal mode the switch is arranged to route traffic bandwidth demand peaks on the free space optics link.

In an embodiment, the indicator comprises one of the end of a said first alarm signal, the end of a said second alarm signal, a first alarm off signal and a second alarm off signal.

A third aspect of the invention provides a method of routing traffic for transmission on a wireless communications link comprising a radio frequency communications link and a free space optics communications link arranged for parallel transmission of traffic. The method comprises:

determining whether a first signal quality parameter of said radio frequency communications link is below a first threshold value and determining whether a second signal quality parameter of said free space optics communications link is below a second threshold value; and selecting one of a normal mode for aggregating said links into a link aggregation group and routing received traffic on the link aggregation group, a first protection mode for routing received traffic on only the free space optics link, and a second protection mode for routing at least some received traffic on only the radio communications link, the normal mode being selected if neither of the first signal quality parameter and the second signal quality parameter is below said respective threshold value, the first protection mode being selected if the first signal quality parameter is below the first threshold value, and the second protection mode being selected if the second signal quality parameter is below the second threshold value.

The radio frequency communications link signal quality is affected by different atmospheric conditions (for example, heavy rain) than the free space optics communications link (for example, heavy fog), the two different links may therefore reciprocally mitigate their susceptibilities to failure due to adverse weather conditions. The method may therefore always be able to route traffic for transmission on at least one part of link. In the normal mode, aggregation of the radio frequency and free space optics communications links is performed, thereby combining the advantages of link aggregation (enabling the establishment of a link which has a higher aggregate bandwidth than the individual links that have been aggregated) with the reciprocal mitigation of susceptibility to adverse weather conditions. The method may therefore enable a wireless communications link to be used as a single primary link, for example as part of the backhaul of a mobile communications network, with a very high link availability and reliability. The method may enable a wireless communications link may provide low power consumption per transmitted bit of traffic. The method may enable routing of high levels of traffic by routing high capacity traffic through the free space optics link.

In an embodiment, the radio frequency communications link comprises a plurality of microwave radio communications links. The method comprises determining whether the first signal quality parameter is below the first threshold value for a said microwave radio communications link and turning off said microwave radio link and selecting the normal mode in respect of the free space optics link and each microwave radio link for which the first signal quality parameter is not below the first threshold value.

The method may therefore disable a microwave radio communications link having a signal quality parameter below the threshold value and continue to operate in the normal mode with the remaining microwave radio communications links aggregated with the free space optics communications link.

In an embodiment, the method selects the normal mode in response to the first signal quality parameter of each microwave radio link has a value below the first threshold value.

In an embodiment, the received traffic comprises high priority traffic and non-high priority traffic and the radio communications link has a traffic transmission capacity. The switch is arranged to operate in the second protection mode to route high priority traffic for transmission in preference to non-high priority traffic and to hold any non-high priority category traffic in excess of the traffic transmission capacity. The method may therefore provide high link availability for high priority and quality traffic, with high priority and quality traffic taking transmission priority over non-high priority traffic in the case of traffic congestion. The method may guarantee traffic priorities and quality of service.

In an embodiment, the best effort traffic is held until one of the normal mode and the first protection mode is selected.

In an embodiment, in the normal mode traffic bandwidth demand peaks are routed on the free space optics link.

In an embodiment, the first signal quality parameter comprises one of signal power and bit error rate. In an embodiment, the second signal quality parameter comprises one of signal power and bit error rate.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of routing traffic for transmission on a wireless communications link comprising a radio frequency communications link and a free space optics communications link arranged for parallel transmission of traffic.

DETAILED DESCRIPTION

Figure 1:
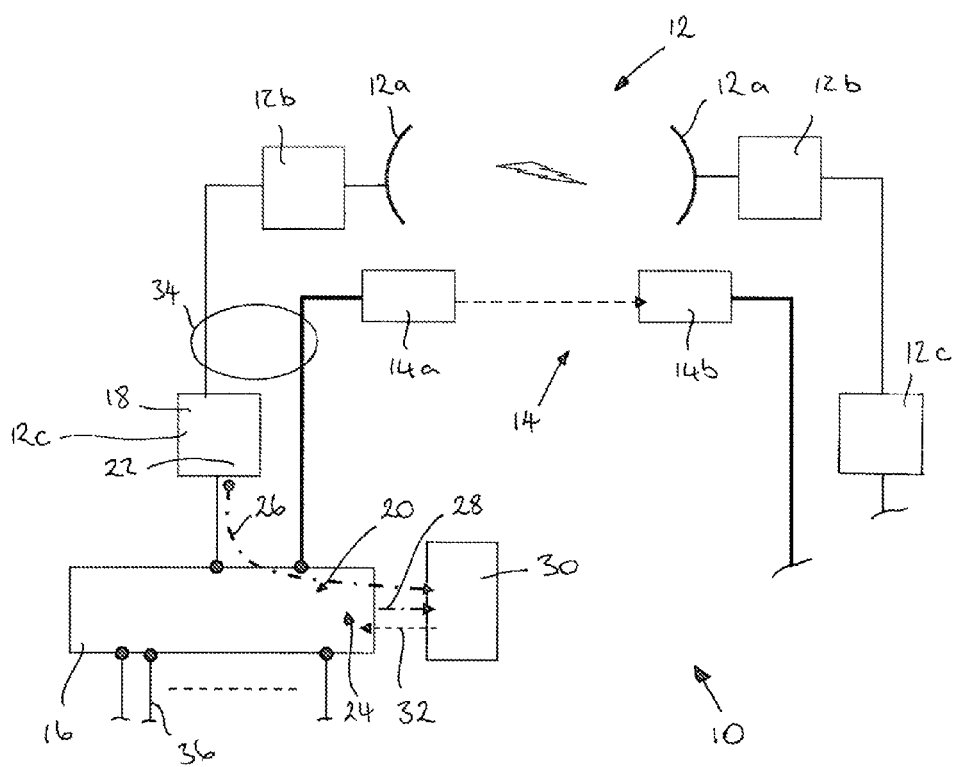
FIG. 1 is a schematic representation of a wireless communications link according to a first embodiment of the invention.

Referring to FIG. 1, a first embodiment of the invention provides a wireless communications link 10 comprising a radio frequency (RF) communications link 12, a free space optics (FSO) communications link 14, a switch 16, link monitoring apparatus 18, 20 and a controller 30. The RF link 12 and the FSO link 14 are arranged for parallel transmission of traffic.

The RF link 12 in this example comprises a spaced pair of radio beacons 12a, first and second radio units 12b and first and second indoor units 12c. It will be appreciated that the RF link 12 shown here is illustrative only and may alternatively comprise a different construction and arrangement. The FSO link 14 comprises a laser 14a and a photodetector 14b. The construction and operation of RF links and FSO links will be well known to the person skilled in the art and so will not be described in further detail here.

The switch 16 is coupled on one side to the RF link 12 and the FSO link 14. The switch 16 is also provided with a number of ports 36 for connection to a communications network. The switch 16 is arranged to operate in one of a normal mode, a first protection mode and a second protection mode. In the normal mode the switch 16 is arranged to aggregate the RF link 12 and the FSO link 14 to form a link aggregation group, indicated generally at 34. The switch 16 is arranged to route received traffic for transmission on the link aggregation group 34. Link aggregation will be understood to mean the aggregation of links into a link aggregation group, following which traffic can be transmitted across the link aggregation group as if it were a single link. Link aggregation enables the establishment of a link which has a higher aggregate bandwidth than the individual links that have been aggregated. The switch 16 therefore operates in the normal mode to route received traffic for transmission on the link aggregation group 34 treating it as if it were a single link having the combined bandwidth of the RF link 12 and the FSO link 14.

In the first protection mode, the switch 16 is arranged to route received traffic for transmission only on the FSO link 14. In the second protection mode the switch 16 is arranged to route at least some of any received traffic for transmission on only the RF link 12.

The link monitoring apparatus comprises RF signal monitoring apparatus 18 and optical signal monitoring apparatus 20. The RF signal monitoring apparatus 18 is arranged to measure a first signal quality parameter for the RF link 12 and the optical signal monitoring apparatus 20 is arranged to measure a second signal quality parameter for the FSO link 14.

The link monitoring apparatus further comprises alarm apparatus 22, 24. The alarm apparatus 22 is arranged to generate and transmit a first alarm signal 26 in response to the first signal quality parameter having a value below a first threshold value. The alarm apparatus 24 is arranged to generate and transmit a second alarm signal 28 in response to the second signal quality parameter having a value below a second threshold value.

The controller 30 is arranged to receive one of a first alarm signal 26, a second alarm signal 28 and an indicator indicating that the first signal quality parameter is above the first threshold value and the second signal quality parameter is above the second threshold value. The controller 30 is further arranged to generate and transmit a control signal 32 to cause the switch 16 to operate in one of the first protection mode, the second protection mode and the normal mode. The control signal 32 is arranged to cause the switch 16 to operate in the first protection mode when a first alarm signal is received, to operate in the second protection mode when the second alarm signal is received, and to operate in the normal mode when an indicator is received.

In operation, if the first signal quality parameter of the RF link 12 falls below the first threshold value, for example due to adverse weather conditions such as heavy rain, the alarm apparatus 22 will generate and transmit a first alarm signal 26. The controller 30 receives the first alarm signal and will generate and transmit a control signal 32 to cause the switch 16 to operate in the first protection mode, to transmit traffic for transmission only on the FSO link 14. If the second signal quality parameter of the FSO link 14 is below the second threshold value, for instance due to adverse weather conditions such as heavy fog, the alarm apparatus 24 will generate and transmit a second alarm signal 28. The controller 30 receives the second alarm signal and will generate and transmit a control signal 32 to cause the switch 16 to operate in the second protection mode, routing at least some of any received traffic for transmission on the RF link 12 only.

Where the first and second signal quality parameters are both above their respective threshold values, or they are returned to being above their threshold values, the switch 16 is caused to operate in the normal mode in which the RF link 12 and the FSO link 14 are aggregated into the link aggregation group 34 and received traffic is transmitted across the link aggregation group 34 as if it were a single link.

Since the RF link 12 and the FSO link 14 are adversely affected by different weather conditions, at least part of the wireless communications link 10 may always be available for transmission of traffic. The wireless communications link 10 combines the advantages of link aggregation (enabling the establishment of a link which has a higher aggregate bandwidth than the individual links that have been aggregated) with the reciprocal mitigation of susceptibility to adverse weather conditions. The wireless communications link 10 may therefore be used as a single primary link, for example as part of the backhaul of a mobile communications network, with a very high link availability and reliability.

Figure 2:
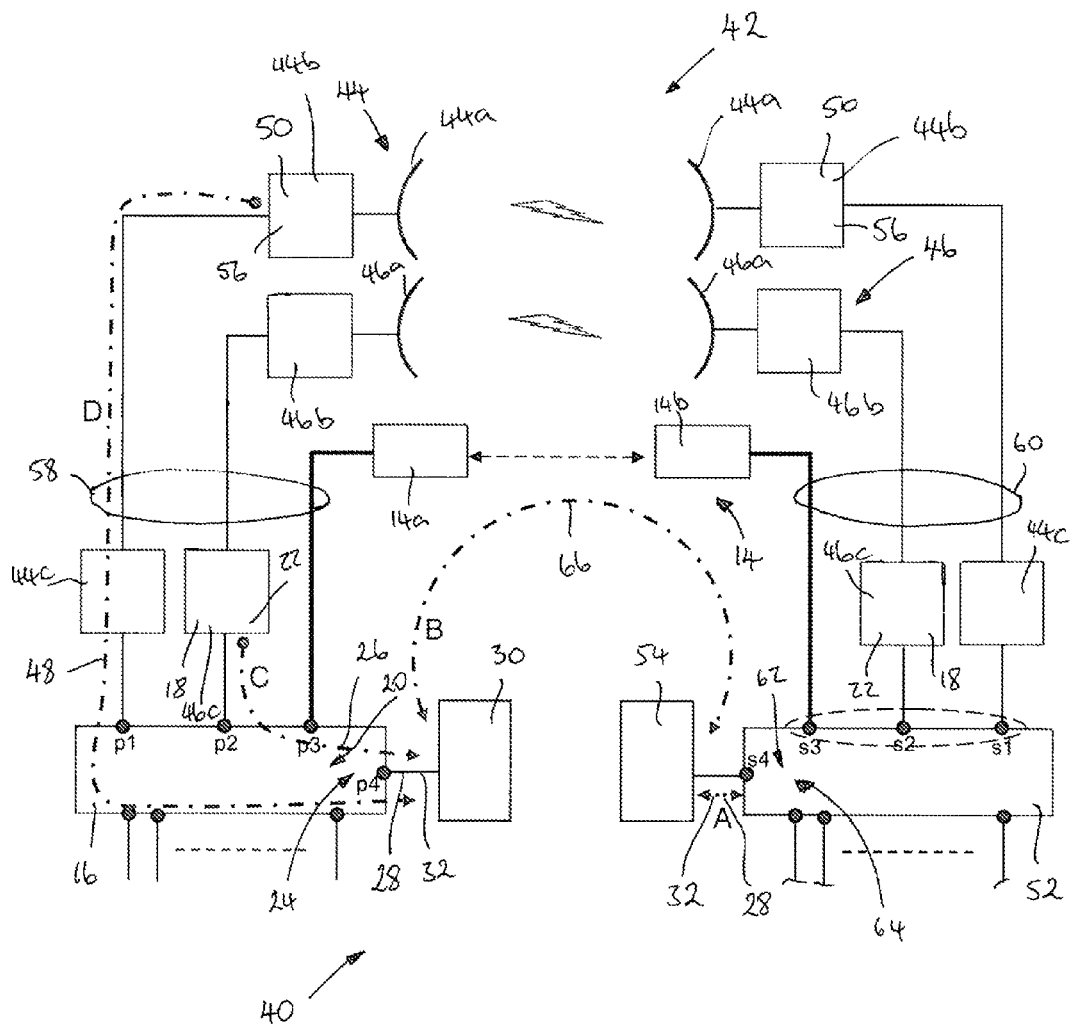
FIG. 2 is a schematic representation of a wireless communications link according to a second embodiment of the invention.

A second embodiment of the invention provides a wireless communications link 40 as shown in FIG. 2. The wireless communications link 40 is similar to the wireless communications link 10 of FIG. 1 and the same reference numbers are retained for corresponding features.

In this embodiment, the RF link 42 comprises a first microwave radio communications link 44 and a second microwave communications link 46. Each microwave link 44, 46 comprises a spaced pair of radio beacons 44a, 46a, radio units 44b, 46b and indoor units 44c, 46c.

The wireless communications link 40 further comprises a second switch 52, a second controller 54, a second RF signal monitoring apparatus 50 and a second optical signal monitoring apparatus 62. The wireless communications link 40 is therefore a bi-directional link.

In this embodiment, each switch 16, 52 comprises an Ethernet self-learning switch arranged to operate in accordance with the IEEE802.1P and IEEE802.1Q standards. Each switch 16, 52 is arranged to aggregate links in accordance with the IEEE802.1AX-2008 link aggregation standard.

Each switch 16, 52 is arranged to operate in one of a normal mode, a first protection mode and a second protection mode. In the normal mode, each switch 16, 52 is arranged to aggregate the microwave links 44, 46 and the FSO link 14 to form a link aggregation group 58 and to route received traffic for transmission on the link aggregation group 58, 60. In the first protection mode, each switch 16, 52 is arranged to route received traffic for transmission only on the FSO link 14. In the second protection mode each switch 16, 52 is arranged to route at least some of any received traffic for transmission on only the RF link 42.

Each microwave link 44, 46 is provided with RF signal monitoring apparatus 18, 50. The RF signal monitoring apparatus 50 of the first microwave link 44 is provided within the radio unit 44b and is arranged to determine whether the signal power falls below a signal power threshold. Alarm apparatus 56 provided within the radio unit 44b is arranged to generate and transmit an alarm signal 48 (D) in response to the signal power falling below the threshold value. The RF signal monitoring apparatus 18 of the second microwave link 46 is provided within the indoor unit 46c and is arranged to detect the bit error rate (BER) of traffic received across the microwave link 46. The alarm apparatus 22 provided in the indoor unit 46c is arranged to generate and transmit an alarm signal 26 (C) if the BER falls below a threshold BER value.

The optical signal monitoring apparatus 20, 62 is provided within each switch 16, 52 and is arranged to monitor the signal power of the FSO link 14. Each second alarm apparatus 24, 64 is arranged to generate and transmit a second alarm signal 28 in response to the optical signal power falling below a threshold value. Alternatively, or additionally, the BER of the FSO link 14 may be monitored by means of operation and maintenance (O&M) signalling 66 (B) sent across the FSO link 14 from the second controller 54 to the first controller 30, and vice versa. The monitoring of BER through O&M signalling will be well known to the person skilled in the art and so will not be described in detail here.

Each controller 30, 54 is arranged to receive an alarm signal 26, 28, 48 from the alarm 22 of the microwave link 46, the alarm apparatus 24, 64 of the FSO link 14 or the microwave link 44 respectively. In response to receipt of one or more alarm signals, each controller 30, 54 is arranged to generate and transmit a control signal 32 to cause the respective switch 16, 52 to operate in one of the normal mode, the first protection mode and the second protection mode, as follows.

If a controller 30, 54 receives an alarm signal 26, 48 for one of the microwave links 44, 46, but not for both of the microwave links, the controller 30, 54 will generate and transmit a control signal to cause the switch 16, 52 to operate in the normal mode for the remaining microwave link (being the microwave link for which an alarm signal has not been received) and the FSO link 14. The switch 16, 52 will therefore aggregate the remaining microwave link 44, 46 and the FSO link 14 into a reduced link aggregation group 58, 60 and transmit traffic across the link aggregation group. If the controller 30, 54 receives an alarm signal 26, 48 for both microwave links 44, 46, or an alarm signal indicating that the signal quality parameter for each microwave link 44, 46 is below the threshold value, the controller 30, 54 will generate and transmit a control signal 30 to cause the switch 16, 52 to operate in the first protection mode, so that received traffic is routed for transmission only on the FSO link 14. If the controller 30, 54 receives an alarm signal 28 from the alarm apparatus 24, 64 of the freespace optics link 14, the controller 30, 54 will generate and transmit a control signal 32 to cause the switch 16, 52 to operate in the second protection mode, in which at least some of any received traffic is routed for transmission only on the microwave links 44, 46. The microwave links 44, 46 are aggregated to form an aggregate link group 58, 60 so that the switch 16, 52 routes the traffic for transmission across the microwave links 44, 46, treating them as if they were a single link.

Each controller 30, 54 is arranged to determine how much transmission capacity has been lost from the wireless communications link 40 as a result of receipt of an alarm signal and to therefore determine how much traffic can be routed for transmission across the wireless communications link 40.

Each switch 16, 52 is arranged to identify whether received traffic is high priority or high quality traffic or is best effort traffic and each controller 30, 54 is arranged to generate and transmit a control signal 32 to cause the respective switch 16, 52 to operate in the second protection mode to route high priority and high quality traffic in preference to best effort traffic. If the traffic exceeds the transmission capacity of the link aggregation group 58, 60 in the second protection mode, each switch 16, 52 is arranged to hold any best effort traffic until the switch 16, 52 is caused to operate in the normal mode or the first protection mode, that is until the freespace optics link 14 returns to operation.

Each controller 30, 54 is arranged to receive an indicator that the optical signal power or BER of a link which was down has returned to a value above its threshold value and is therefore again available for traffic transmission. In response to receiving an indicator each controller 30, 54 is arranged to generate and transmit a control signal 32 to cause the respective switch 16, 52 to return to operation in the normal mode. The indicator may comprise one of an alarm OFF signal from the respective signal alarm apparatus 22, 24, 56 or may comprise termination of an alarm signal 26, 28, 48 being received by the controller 30, 54.

Figure 3:
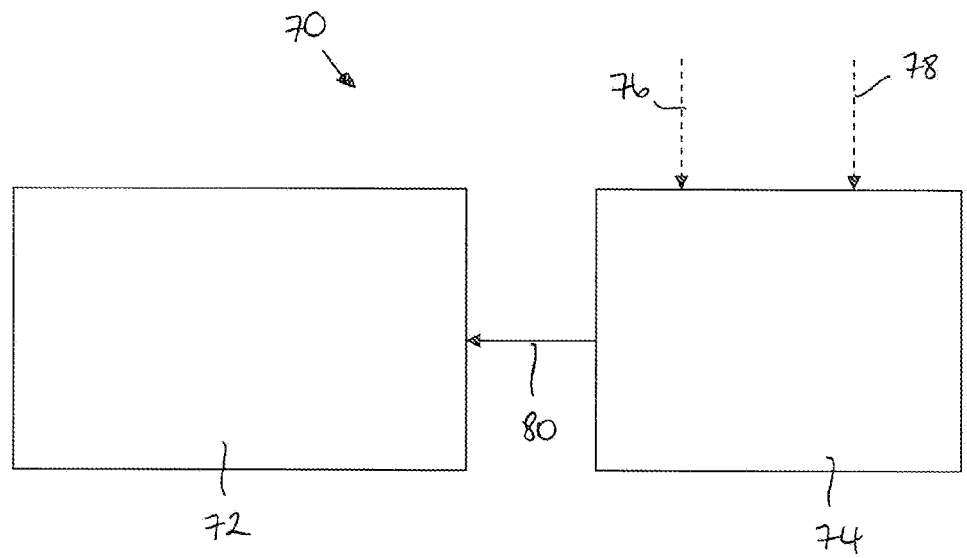
FIG. 3 is a schematic representation of routing apparatus for a wireless communications link according to a third embodiment of the invention.

A third embodiment of the invention provides routing apparatus 70 according to a third embodiment of the invention as shown in FIG. 3. The routing apparatus 70 is for a wireless communications link comprising an RF communications link and an FSO communications link arranged for parallel transmission of traffic. The routing apparatus 70 comprises a switch 72 and a controller 74.

The switch 72 is arranged to operate in one of a normal mode, a first protection mode and a second protection mode. In the normal mode the switch 72 is arranged to aggregate the RF link and the FSO link to form a link aggregation group and to route received traffic for transmission on the link aggregation group. In the first protection mode the switch 72 is arranged to route received traffic for transmission only on the FSO link. In the second protection mode the switch 72 is arranged to route at least some of any received traffic for transmission only on the RF link.

The controller 74 is arranged to receive one of a first alarm signal 76 and a second alarm signal 78. The first alarm signal 76 is indicative that a first signal quality parameter of the RF link has a value below a first threshold value. The second alarm signal 78 is indicative that a second signal quality parameter of the FSO link has a value below a second threshold value. The controller 74 is further arranged to receive an indicator indicating that the first signal quality parameter is above the first threshold value and the second signal quality parameter is above the second threshold value.

The controller 74 is further arranged to generate and transmit a control signal 80. When a first alarm signal 76 is received the control signal 80 is to cause the switch 72 to operate in the first protection mode. When a second alarm signal 78 is received the control signal 80 is to cause the switch to operate in the second protection mode. When an indicator is received the control signal 80 is to cause the switch 72 to operate in the normal mode.

Figure 4:
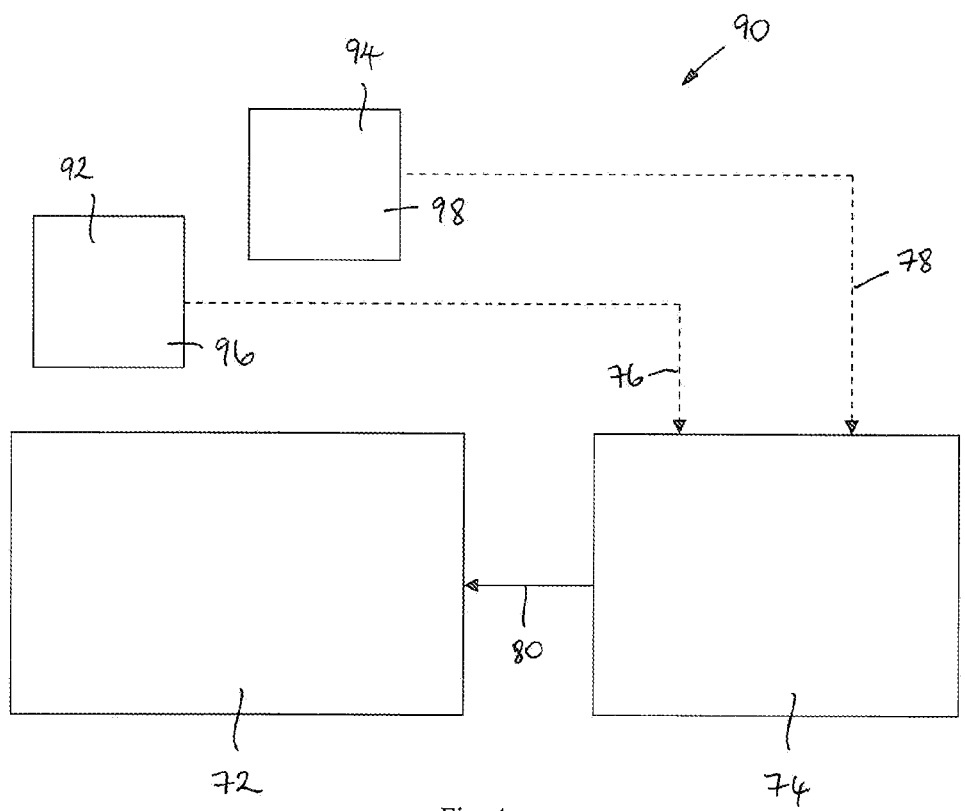
FIG. 4 is a schematic representation of a routing apparatus for a wireless communications link according to a fourth embodiment of the invention.

Routing apparatus 90 according to a fourth embodiment of the invention is shown in FIG. 4. The routing apparatus 90 is substantially the same as the routing apparatus 70 of FIG. 3, with the following modifications. The same reference numbers are retained for corresponding features.

In this embodiment, the routing apparatus 90 further comprises link monitoring apparatus comprising RF signal monitoring apparatus 92 and optical signal monitoring apparatus 94. The RF signal monitoring apparatus 92 is arranged to measure the first signal quality parameter for the RF link. The optical signal monitoring apparatus 94 is arranged to measure the second signal quality parameter for the FSO link. The link monitoring apparatus further comprises alarm apparatus 96 arranged to generate and transmit a first alarm signal 76 in response to the first signal quality parameter having a value below the first threshold value. The link monitoring apparatus further comprises alarm apparatus 98 arranged to generate and transmit a second alarm signal 78 in response to the second signal quality parameter having a value below the second threshold value.

In a further embodiment, the RF communications link may comprise a plurality of microwave communications links and the routing apparatus 90 will comprise a corresponding number of microwave link monitoring apparatus arranged to measure the first signal quality parameter for each respective microwave link. The alarm apparatus 96 is arranged to generate and transmit an alarm signal 76 in response to the first signal quality parameter of a microwave link having a value below the first threshold value.

In the situation where an alarm signal 76 is received for one microwave link but not all microwave links, the controller 74 is arranged to generate and transmit a control signal 80 to cause the switch 72 to turn off the respective microwave link for which the alarm signal has been received and to operate in the normal mode in respect of the FSO link and the remaining microwave link/s.

The switch 72 is arranged to identify whether received traffic comprises high priority traffic or high quality traffic or whether the traffic comprises best effort traffic. The switch 72 is arranged to operate in the second protection mode to route high quality and high priority traffic for transmission in preference to best effort traffic. In the second protection mode, the switch 72 is arranged to hold any best effort traffic in excess of the traffic transmission capacity of the aggregated microwave links until the switch 72 is caused to operate in the normal mode or the first protection mode, in which the FSO link is available for traffic transmission.

Figure 5:
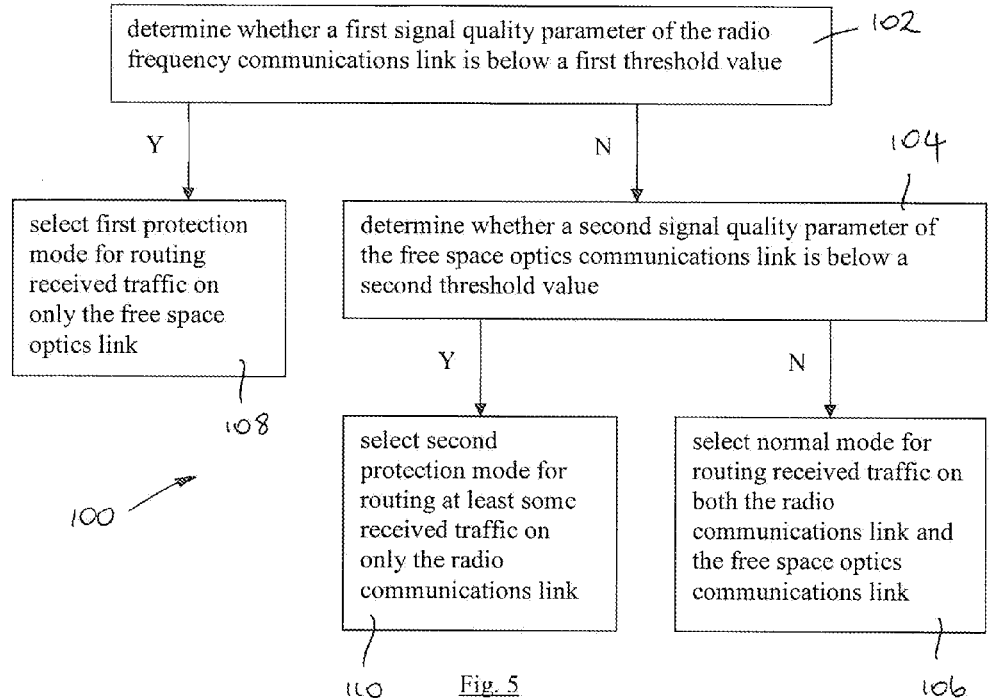
FIG. 5 shows the steps of a method of routing traffic for transmission on a wireless communications link comprising a radio frequency communications link and a free space optics communications link arranged for parallel transmission of traffic according to a fifth embodiment of the invention.

FIG. 5 shows the steps of a method 100 of routing traffic according to a fifth embodiment of the invention, the method being for routing traffic for transmission on a wireless communications link comprising an RF communications link and an FSO communications link arranged for parallel transmission of traffic.

The method 100 comprises determining whether a first signal quality parameter of the RF link is below a first threshold value 102 and determining whether a second signal quality parameter of the FSO link is below a second threshold value 104.

The method 100 further comprises selecting one of a normal mode 106, a first protection mode 108 and a second protection mode 110. In the normal mode the RF and FSO links are aggregated into a link aggregation group and received traffic is routed on the link aggregation group. In the first protection mode, received traffic is routed on only the FSO link. In the second protection mode at least some received traffic is routed on only the RF link.

As indicated in FIG. 5, the normal mode is selected 106 if neither the first signal quality parameter nor the second signal quality parameter is below its respective threshold value. The first protection mode is selected 108 if the first signal quality parameter is below the first threshold value. The second protection mode is selected if the second signal quality parameter is below the second threshold value 110.

Figure 6:
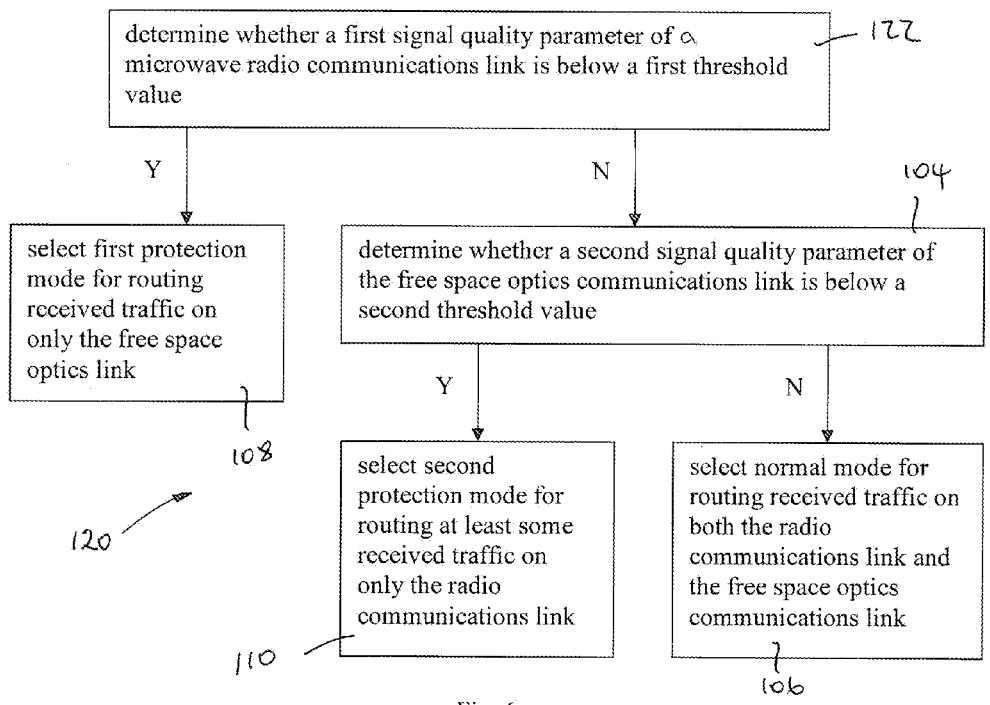
FIG. 6 shows the steps of a method of routing traffic for transmission on a wireless communications link comprising a radio frequency communications link and a free space optics communications link arranged for parallel transmission of traffic according to a sixth embodiment of the invention.

FIG. 6 shows the steps of a method 120 of routing traffic for transmission according to a sixth embodiment of the invention, the traffic being for transmission on a wireless communications link comprising a plurality of microwave radio communications links and an FSO link.

The method 120 comprises determining whether the first signal quality parameter is below the first threshold value for any of the microwave links 122. If the first signal quality parameter is below the threshold value for one of the microwave links, the method comprises determining whether the first signal quality parameter for each of the remaining microwave links is below the first threshold value 130. If the first signal quality parameter of each microwave link is below the first threshold value the method 120 comprises selecting the first protection mode for routing received traffic only on the FSO link 132. If the first signal quality parameter of none of the microwave links is below the first threshold value or if the first signal quality parameter of only some of the microwave links is below the first threshold value the method 120 comprises selecting the second protection mode for routing at least some received traffic on the available microwave links 128 if the second signal quality parameter of the FSO link is below the second threshold value 124. The normal mode for routing received traffic on the available microwave links and the FSO link is selected 126 if the second signal quality parameter of the FSO link is not below a second threshold value 124.

The method 120 therefore selects the normal mode for operation if any of the microwave links and the FSO link are available for transmitting traffic and aggregates the available links into a link aggregation group. If the FSO link is not available for transmission of traffic the method 120 selects the second protection mode and routes the received traffic on only the available microwave links, which may be all of the microwave links or fewer than all of the microwave links, as set out above. If all of the microwave links are unavailable for transmission of traffic the method 120 selects the first protection mode for routing received traffic on only the FSO link.

Figure 7:
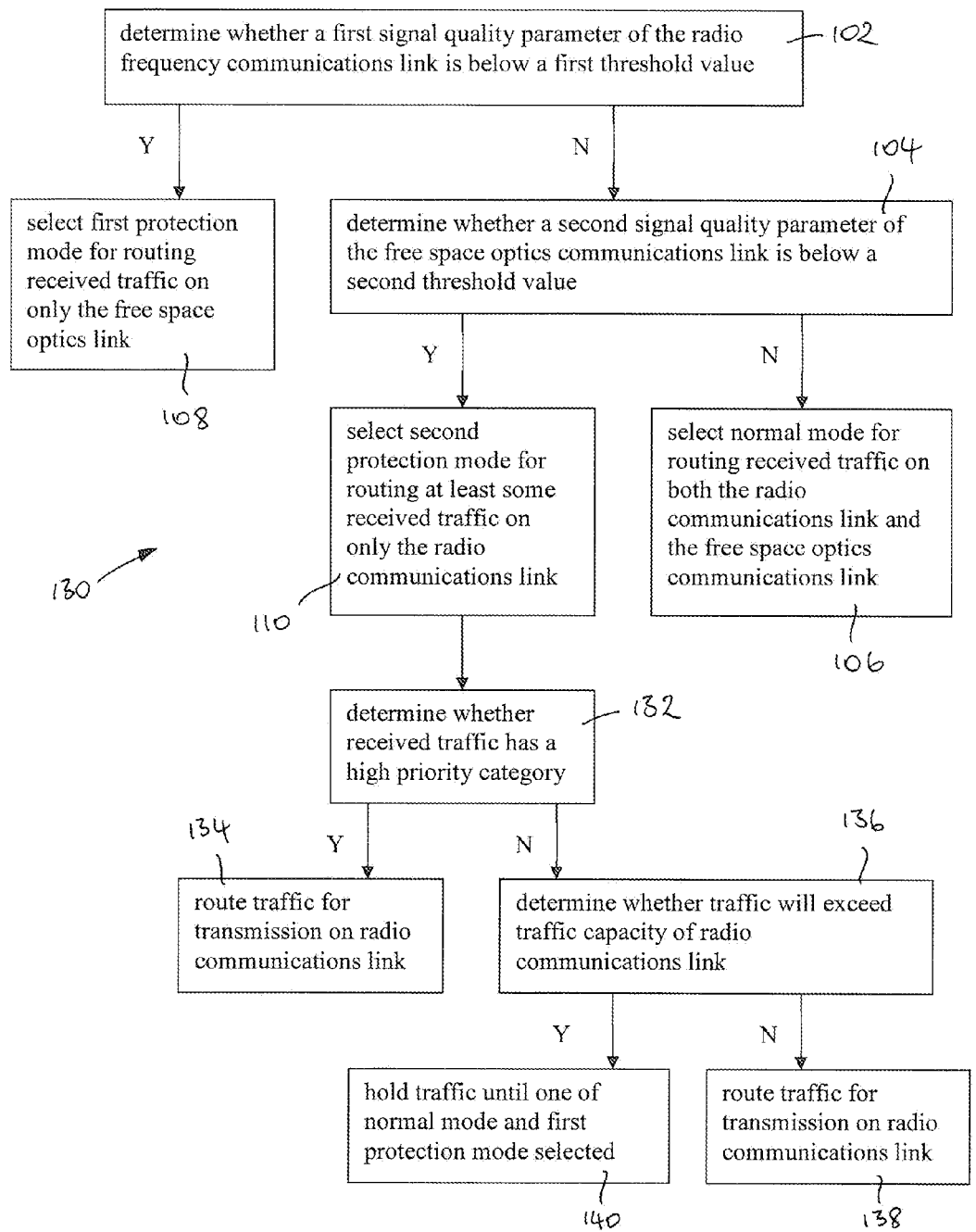
FIG. 7 shows the steps of a method of routing traffic for transmission on a wireless communications link comprising a radio frequency communications link and a free space optics communications link arranged for parallel transmission of traffic according to a seventh embodiment of the invention.

The steps of a method 140 of routing traffic according to a seventh embodiment of the invention are shown in FIG. 7. The method 140 is for routing traffic for transmission on a wireless communications link comprising an RF link and an FSO link arranged for parallel transmission of traffic. The method 140 is substantially the same as the method 110 of FIG. 5, with the following additional steps. The same reference numbers are used for corresponding steps.

The received traffic comprises high priority traffic and non high priority traffic, such as best effort traffic. The method 140 further comprises, in the second protection mode, determining whether received traffic is high priority traffic 142 and if the traffic is high priority, routing the traffic for transmission on the RF link 144. If the received traffic is not high priority traffic, the traffic will only be routed for transmission if there is available capacity on the RF link. The method 140 therefore comprises determining whether the non high priority traffic will exceed the traffic capacity of the RF link 146 and if it will, the method comprises holding the traffic until one of the normal mode and the first protection mode is selected 150, in which the FSO link capacity is additionally available. If the non high priority traffic does not exceed the traffic capacity of the RF link, the method 140 comprises routing the traffic for transmission on the RF link 148.

The invention claimed is:
1. A wireless communications link comprising:
a radio frequency communications link and a free space optics communications link arranged for parallel transmission of traffic;
a switch arranged to operate in one of a normal mode in which the switch is arranged to aggregate the links to form a link aggregation group and to route received traffic for transmission on the link aggregation group, a first protection mode in which the switch is arranged to route received traffic for transmission on only the free space optics communications link, and a second protection mode in which the switch is arranged to route at least some of said received traffic for transmission on only the radio frequency communications link;
a link monitoring apparatus comprising a radio frequency signal monitoring apparatus arranged to measure a first signal quality parameter for the radio frequency communications link and an optical signal monitoring apparatus arranged to measure a second signal quality parameter for the free space optics communications link, and further comprising an alarm apparatus arranged to generate and transmit a first alarm signal in response to the first signal quality parameter having a value below a first threshold value and further arranged to generate and transmit a second alarm signal in response to the second signal quality parameter having a value below a second threshold value; and
a controller arranged to receive one of a said first alarm signal, a said second alarm signal and an indicator indicating that the first signal quality parameter is above the first threshold value and the second signal quality parameter is above the second threshold value, and the controller further being arranged to generate and transmit a control signal to cause the switch to operate in one of the first protection mode when a said first alarm signal is received, the second protection mode when a said second alarm signal is received, and the normal mode when a said indicator is received.

2. The wireless communications link as claimed in claim 1, wherein the radio frequency communications link comprises a plurality of microwave radio communications links and the link monitoring apparatus comprises a corresponding plurality of radio frequency signal monitoring apparatus arranged to measure the first signal quality parameter for a respective microwave radio link, and the alarm apparatus is arranged to generate and transmit a third alarm signal in response to a said first signal quality parameter of a respective microwave radio link having a value below the first threshold value, and the controller being arranged to receive the third alarm signal and being further arranged to generate and transmit a control signal to cause the switch to turn off said microwave radio link and to operate in the normal mode in respect of the free space optics link and each microwave radio link for which a said third alarm signal has not been received.

3. The wireless communications link as claimed in claim 1, wherein the switch comprises an Ethernet self-learning switch arranged to operate in accordance with the Institute of Electrical and Electronics Engineers (IEEE) 802.1p and IEEE 802.1q standards and to aggregate the links in accordance with the IEEE 802.1AX-2008 link aggregation standard.

4. The wireless communications link as claimed in claim 1, wherein the received traffic comprises high priority traffic and non-high priority traffic and the radio communications link has a traffic transmission capacity, and the switch is arranged to operate in the second protection mode to route high priority traffic for transmission in preference to non-high priority traffic and to hold any non-high priority traffic in excess of the traffic transmission capacity.

5. The wireless communications link as claimed in claim 4, wherein the received traffic comprises high quality traffic and high priority traffic and best effort traffic and the switch is arranged to operate in the second protection mode to route the high quality traffic and the high priority traffic for transmission in preference to the best effort traffic and to hold any best effort traffic in excess of the traffic transmission capacity.

6. The wireless communications link as claimed in claim 5, wherein the switch is arranged to hold the best effort traffic until the switch is caused to operate in one of the normal mode and the first protection mode.

7. A routing apparatus for a wireless communications link comprising a radio frequency communications link and a free space optics communications link arranged for parallel transmission of traffic, the apparatus comprising:
   a switch arranged to operate in one of a normal mode in which the switch is arranged to aggregate the links to form a link aggregation group and to route received traffic for transmission on the link aggregation group, a first protection mode in which the switch is arranged to route received traffic for transmission on only the free space optics communications link, and a second protection mode in which the switch is arranged to route at least some of said received traffic for transmission on only the radio frequency communications link; and
   a controller arranged to receive one of a first alarm signal indicative that a first signal quality parameter of the radio frequency communications link has a value below a first threshold value, a second alarm signal indicative that a second signal quality parameter of the free space optics communications link has a value below a second threshold value, and an indicator indicating that the first signal quality parameter is above the first threshold value and the second signal quality parameter is above the second threshold value, and the controller being further arranged to generate and transmit a control signal to cause the switch to operate in one of the first protection mode when a said first alarm signal is received, the second protection mode when a said second alarm signal is received, and the normal mode when a said indicator is received.

8. The routing apparatus as claimed in claim 7, wherein the routing apparatus further comprises a link monitoring apparatus comprising a radio frequency signal monitoring apparatus arranged to measure the first signal quality parameter for the radio frequency communications link and an optical signal monitoring apparatus arranged to measure the second signal quality parameter for the free space optics communications link, and further comprising an alarm apparatus arranged to generate and transmit a first alarm signal in response to the first signal quality parameter having a value below the first threshold value and further arranged to generate and transmit a second alarm signal in response to the second signal quality parameter having a value below the second threshold value.

9. The routing apparatus as claimed in claim 7, wherein the radio frequency communications link comprises a plurality of microwave radio communications links and the link monitoring apparatus comprises a corresponding plurality of radio frequency signal monitoring apparatus arranged to measure the first signal quality parameter for a respective microwave radio link, and the alarm apparatus is arranged to generate and transmit a third alarm signal in response to a said first signal quality parameter of a respective microwave radio link having a value below the first threshold value, and the controller being arranged to receive the third alarm signal and being further arranged to generate and transmit a control signal to cause the switch to turn off said microwave radio link and to operate in the normal mode in respect of the free space optics link and each microwave radio link for which a said third alarm signal has not been received.

10. The routing apparatus as claimed in claim 7, wherein the switch comprises an Ethernet self-learning switch arranged to operate in accordance with the Institute of Electrical and Electronics Engineers (IEEE) 802.1p and IEEE 802.1q standards and to aggregate the links in accordance with the IEEE 1 AX-2008 link aggregation standard.

11. The routing apparatus as claimed in claim 7, wherein the received traffic comprises high priority traffic and non-high priority traffic and the radio communications link has a traffic transmission capacity, and the switch is arranged to operate in the second protection mode to route high priority traffic for transmission in preference to non-high priority traffic and to hold any non-high priority traffic in excess of the traffic transmission capacity.

12. The routing apparatus as claimed in claim 11, wherein the received traffic comprises high quality traffic and high priority traffic and best effort traffic and the switch is arranged to operate in the second protection mode to route the high quality traffic and the high priority traffic for transmission in preference to the best effort traffic and to hold any best effort traffic in excess of the traffic transmission capacity.

13. The routing apparatus as claimed in claim 11, wherein the switch is arranged to hold the best effort traffic until the switch is caused to operate in one of the normal mode and the first protection mode.

14. A method of routing traffic for transmission on a wireless communications link comprising a radio frequency communications link and a free space optics communications link arranged for parallel transmission of traffic, the method comprising:
   determining whether a first signal quality parameter of said radio frequency communications link is below a first threshold value and determining whether a second signal quality parameter of said free space optics communications link is below a second threshold value; and
   selecting one of a normal mode for aggregating said links into a link aggregation group and routing received traffic on the link aggregation group, a first protection mode for routing received traffic on only the free space optics link, and a second protection mode for routing at least some received traffic on only the radio communications link, the normal mode being selected if neither of the first signal quality parameter and the second signal quality parameter is below said respective threshold value, the first protection mode being selected if the first signal quality parameter is below the first threshold value, and the second protection mode being selected if the second signal quality parameter is below the second threshold value.

15. The method as claimed in claim 14, wherein the radio frequency communications link comprises a plurality of microwave radio communications links and the method comprises determining whether the first signal quality parameter is below the first threshold value for a said microwave radio communications link and turning off said microwave radio link and selecting the normal mode in respect of the free space optics link and each microwave radio link for which the first signal quality parameter is not below the first threshold value.

16. The method as claimed in claim 14, wherein the received traffic comprises high priority traffic and non-high priority traffic and the radio communications link has a traffic transmission capacity, and the second protection mode is for routing high priority traffic for transmission in preference to non-high priority traffic and holding any non-high priority category traffic in excess of the traffic transmission capacity.

17. The method as claimed in claim 16, wherein the non-high traffic is held until one of the normal mode and the first protection mode is selected.

\* \* \* \* \*